(12) United States Patent  (10) Patent No.: US 8,817,815 B2
Chidambaram et al.  (45) Date of Patent: Aug. 26, 2014

(54) TRAFFIC OPTIMIZATION OVER NETWORK LINK

(75) Inventors: Natarajan Chidambaram, Dublin, CA (US); Arivu Ramasamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 13/335,358

(22) Filed: Dec. 22, 2011

(65) Prior Publication Data

US 2013/0163470 A1   Jun. 27, 2013

(51) Int. Cl.
*G06F 15/16*  (2006.01)

(52) U.S. Cl.
USPC ..................... 370/466; 370/395.52

(58) Field of Classification Search
USPC .............................................. 370/466, 395.52
See application file for complete search history.

(56) References Cited

U.S. PATENT DOCUMENTS

| | | | |
|---|---|---|---|
| 6,442,158 B1* | 8/2002 | Beser | 370/352 |
| 7,392,323 B2* | 6/2008 | Yim et al. | 709/236 |
| 7,609,701 B2* | 10/2009 | Yang et al. | 370/395.52 |
| 7,639,625 B2* | 12/2009 | Kaminsky et al. | 370/248 |
| 8,130,671 B2* | 3/2012 | Park et al. | 370/254 |
| 2004/0148347 A1* | 7/2004 | Appelman et al. | 709/204 |
| 2006/0104288 A1* | 5/2006 | Yim et al. | 370/395.52 |
| 2007/0195800 A1* | 8/2007 | Yang et al. | 370/401 |
| 2008/0212484 A1 | 9/2008 | Kaminsky et al. | |
| 2009/0141722 A1* | 6/2009 | Hall et al. | 370/392 |
| 2009/0157866 A1* | 6/2009 | Sridharan et al. | 709/224 |
| 2009/0220080 A1* | 9/2009 | Herne et al. | 380/255 |
| 2009/0259755 A1* | 10/2009 | Boucachard et al. | 709/227 |
| 2009/0296685 A1* | 12/2009 | O'Shea et al. | 370/351 |
| 2010/0142533 A1* | 6/2010 | Hall et al. | 370/392 |
| 2010/0211673 A1* | 8/2010 | Kosbab et al. | 709/224 |
| 2011/0202610 A1* | 8/2011 | Chaturvedi et al. | 709/206 |
| 2011/0255537 A1 | 10/2011 | Ramasamy et al. | |
| 2012/0102148 A1* | 4/2012 | Arolovitch et al. | 709/217 |
| 2012/0106559 A1* | 5/2012 | Kim et al. | 370/401 |
| 2012/0162445 A1* | 6/2012 | Kim et al. | 348/207.1 |
| 2013/0033994 A1* | 2/2013 | Parekh et al. | 370/252 |
| 2013/0067101 A1* | 3/2013 | Xu et al. | 709/228 |
| 2013/0073743 A1* | 3/2013 | Ramasamy et al. | 709/238 |

\* cited by examiner

*Primary Examiner* — John Blanton
*Assistant Examiner* — Jay P Patel
(74) *Attorney, Agent, or Firm* — Cindy Kaplan

(57) ABSTRACT

In one embodiment, a method includes receiving a TCP (Transmission Control Protocol) packet at a service device configured to optimize traffic over a network link, inserting a discovery identifier in the TCP packet, encapsulating the TCP packet in a UDP (User Datagram Protocol) packet, and transmitting the UDP packet over the network link. An apparatus is also disclosed.

18 Claims, 6 Drawing Sheets

TRAFFIC OPTIMIZATION OVER NETWORK LINK

TECHNICAL FIELD

The present disclosure relates generally to communication networks, and more particularly, to traffic optimization over network link.

BACKGROUND

In order to handle inherent inefficiencies of native TCP (Transmission Control Protocol), a device at a network link may use an options field within a TCP packet to accelerate traffic over the network link. For example, a satellite link modem or other TCP proxy may use the TCP options field to accelerate traffic. Other devices may also use the TCP options field for optimization of network traffic. For example, wide area application services devices used to optimize network traffic flow and accelerate applications may also use the TCP options field. However, the satellite link modem overwrites the TCP options field, thus interfering with the optimization process.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
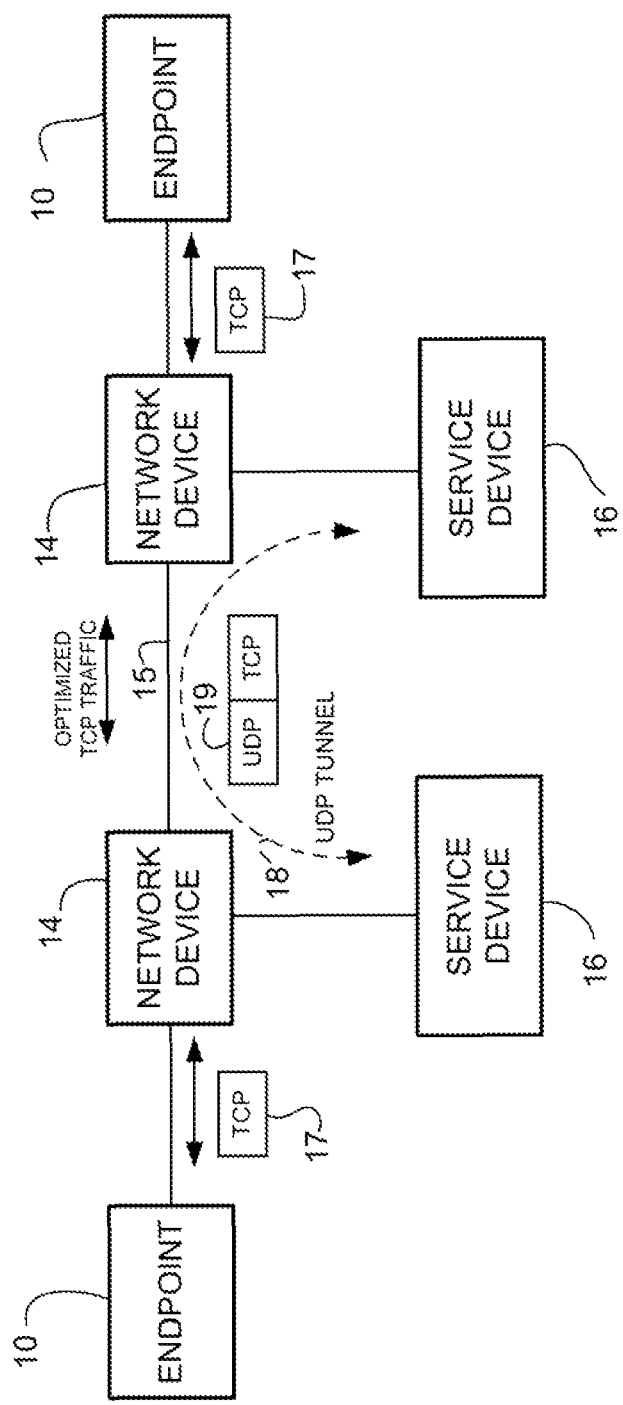
FIG. 1 illustrates an example of a network in which embodiments described herein may be implemented.

In one embodiment, a method generally comprises receiving a TCP (Transmission Control Protocol) packet at a service device configured to optimize traffic over a network link, inserting a discovery identifier in the TCP packet, encapsulating the TCP packet in a UDP (User Datagram Protocol) packet and transmitting the UDP packet over the network link.

In another embodiment, an apparatus generally comprises a processor for receiving a TCP (Transmission Control Protocol) packet, inserting a discovery identifier in the TCP packet, encapsulating the TCP packet in a UDP (User Datagram Protocol) packet, and transmitting the UDP packet over a network link. The apparatus further comprises a traffic optimizer for optimizing traffic on the network link.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For clarity, details relating to technical material that is known in the technical fields related to the embodiments have not been described in detail.

Transparent network service devices, such as wide area application services devices, are used in network deployments to optimize network traffic flow and accelerate applications over a wide area network (WAN). In some network topologies, a TCP (Transmission Control Protocol) proxy may be located at a link between the service devices. For example, a satellite link may include a satellite link modem which uses a TCP options field to accelerate traffic over the link. The service device may also use the TCP options field to optimize traffic transmitted over the link. In this case, the satellite modem overwrites the content of the TCP options field inserted by the service device. This prevents the service device from performing traffic optimization. In order to deploy wide area application services in conventional systems, the TCP options need to be turned off at the TCP proxy in order to allow optimization by the service device. This is often difficult and may not even be possible in some cases. Another option is to establish a static TCP tunnel over the satellite link and accelerate the TCP traffic through the tunnel. However, this has many drawbacks. For example, as the number of endpoints increases, the configuration of the tunnels becomes complex and difficult to manage.

The embodiments described herein allow for optimization of traffic over a network link such as a satellite link, without disabling TCP options on the link or configuring static TCP tunnels. As described in detail below, dynamic UDP (User Datagram Protocol) tunnels are established for an initial TCP connection setup. After the TCP connection is established, optimized traffic does not need to use the UDP tunnel. Therefore, drawbacks associated with conventional static tunnels do not exist. In one or more embodiments, end-to-end transparency is maintained for all traffic except the initial TCP connection setup.

Referring now to the drawings, and first to FIG. 1, an example of a network in which the embodiments described herein may be implemented is shown. The embodiments operate in the context of a data communications network including multiple network devices interconnecting communication paths for receiving and transmitting packets of information that propagate through the network. The example shown in FIG. 1 includes two endpoints 10 in communication through network devices 14 communicating over a network link 15. The endpoints 10 may be, for example, client and server nodes operating as a source or destination for traffic transmitted over the network. Traffic (packets) transmitted between the endpoints 10 may be redirected (intercepted) at network device 14 and transmitted to a service device 16 for application of services.

The client node 10 may be, for example, a personal computer, mobile device, personal digital assistant (PDA), VoIP phone, tablet, cellular telephone, telepresence device, media center device, or any other device configured to communicate over the network. The server 10 may belong to a data center, branch office, or a virtual private cloud, for example. The server 10 may be a physical network device, logical device (e.g., virtual machine installed on server), or a mobile server, for example. Traffic may include video, audio, text, graphics, or any other data. Traffic may be encrypted, compressed, or encoded according to any format.

The network device 14 may be a router, gateway, firewall, switch, load balancer, or other network device. The network device 14 is configured to redirect traffic to the service device 16 in accordance with a traffic redirection scheme such as Web Cache Communication Protocol (WCCP) or PBR (Policy Based Routing).

The service device 16 may be, for example, a WAAS (Wide Area Application Services) device (e.g., appliance or optimization engine (traffic optimizer) configured to provide application specific acceleration or WAN optimization capabilities), or any other network device operable to perform network services. The WAAS device may be, for example, a wide area application engine (WAE) configured to optimize TCP traffic over the network. The service device 16 may be a physical appliance, virtual appliance, router-integrated service module, or any other network device operable to perform a service (e.g., application performance improvements (optimization, acceleration), etc.) on network traffic. For example, the service device 16 may provide application acceleration to overcome limitations of application operation in WAN environments, such as bandwidth usage and application-layer latency. The service device 16 may provide, for example, compression to minimize bandwidth consumed on the WAN.

As part of the optimization process, the service device performs a discovery process (e.g., auto-discovery) that enables the service device to automatically locate peer service devices on the network. Discovery may be used, for example, to identify a peer service device, negotiate configuration parameters with the peer service device, or setup a connection. Once the service device 16 establishes a connection to a peer service device, the two devices can establish an optimized link for TCP traffic. A discovery identifier (described below) provides information (e.g., service device or optimization configuration or parameters) that is used in the optimization process. In one embodiment, the discovery identifier is a discovery option inserted in an options field in the TCP packet. The TCP options are recognized and understood by the corresponding service devices 16 and ignored by other network devices.

For simplification, only two service devices 16 are shown in FIG. 1, however, the network devices 14 may be in communication with any number of service nodes and any number of clusters of service nodes, with each cluster providing a different service, for example. Also, there may be any number of endpoints 10 in communication via one or more communication paths. One or more of the service devices 16 may also reside physically within the path of traffic flow, in which case there is no need for network device 14 to redirect traffic to the service device. For example, the service device 16 may comprise an inline network adapter for use in intercepting traffic directly or may be integrated with a router in the network path.

In the examples described herein, the service devices 16 are referred to as local and remote service devices. It is to be understood that the terms 'local' and 'remote' are used herein to identify different service devices 16 located at opposite ends of the network link 15. For example, the local service device may be located near a source (client) and the remote service device may be located near a destination (server). The service devices 16 may be located any distance apart from one another and each service device may operate as a local or remote service device.

The communication system may include one or more networks (e.g., local area network, metropolitan area network, wide area network, satellite network, enterprise network, Internet, intranet, radio access network, public switched network, virtual private network, or any other network). Communication paths between the endpoints 10 and between the network devices 14 and service devices 16 may include any number or type of intermediate nodes (e.g., routers, switches, gateways, or other network devices), which facilitate passage of data between the network devices.

The network link located 15 located between the service devices 16 may include, for example, a satellite link or other network link. The communication system may also include a satellite link modem or other TCP proxy, which uses the TCP options field to accelerate traffic over the link, or any another purpose which results in the TCP option inserted by the service device being written over. The network may also include one or more firewalls, which do not normally operate with the use of TCP options. In this case, the firewall is configured with a UDP port open.

As described in detail below, the service device 16 is configured to encapsulate a TCP packet 17 in a UDP packet 19 for transmittal on a dynamic UDP tunnel 18 created between the service devices for use in discovering a peer service device and negotiating an optimization scheme between the service devices. This allows the service devices 16 to optimize (accelerate) traffic over the network link 15 since a discovery identifier within the encapsulated TCP packet will not be impacted by other devices interposed between the service devices. After the discovery process is complete, the optimized network traffic may be sent directly over the link as TCP traffic (shown in FIG. 1) or can continue to be sent over the UDP tunnel 18 as UDP traffic.

It is to be understood that the network shown in FIG. 1 and described herein is only an example and that the embodiments may be implemented in networks having different network topologies and network devices, without departing from the scope of the embodiments.

Figure 2:
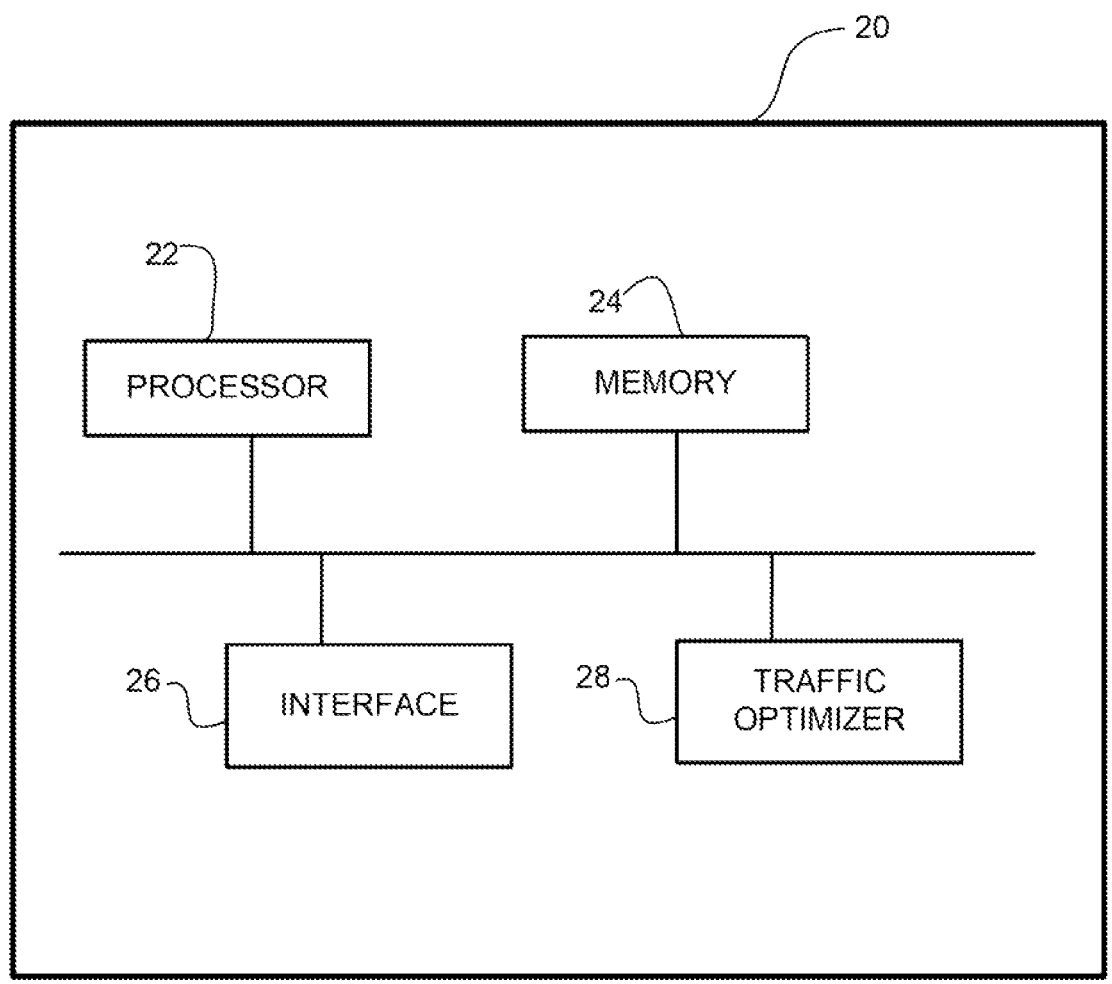
FIG. 2 depicts an example of a network device that may be used to implement the embodiments.

FIG. 2 illustrates an example of a network device (e.g., service device) 20 that may be used to implement the embodiments described herein. In one embodiment, the network device 20 is a programmable machine that may be implemented in hardware, software, or any combination thereof. The network device 20 includes one or more processor 22, memory 24, network interface 26, and traffic optimizer 28. Memory 24 may be a volatile memory or non-volatile storage, which stores various applications, operating systems, modules, and data for execution and use by the processor 22. The traffic optimizer 28 is operable to optimize network traffic, as previously described.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise one or more interfaces (linecards, ports) for receiving data or transmitting data to other devices. The interface 26 may include, for example, an Ethernet interface for connection to a computer or network.

The network device 20 may further include any suitable combination of hardware, software, algorithms, processors, devices, components, or elements operable to facilitate the capabilities described herein. It is to be understood that the network device 20 shown in FIG. 2 and described above is only an example and that different components and configurations may be used, without departing from the scope of the embodiments.

Figure 3:
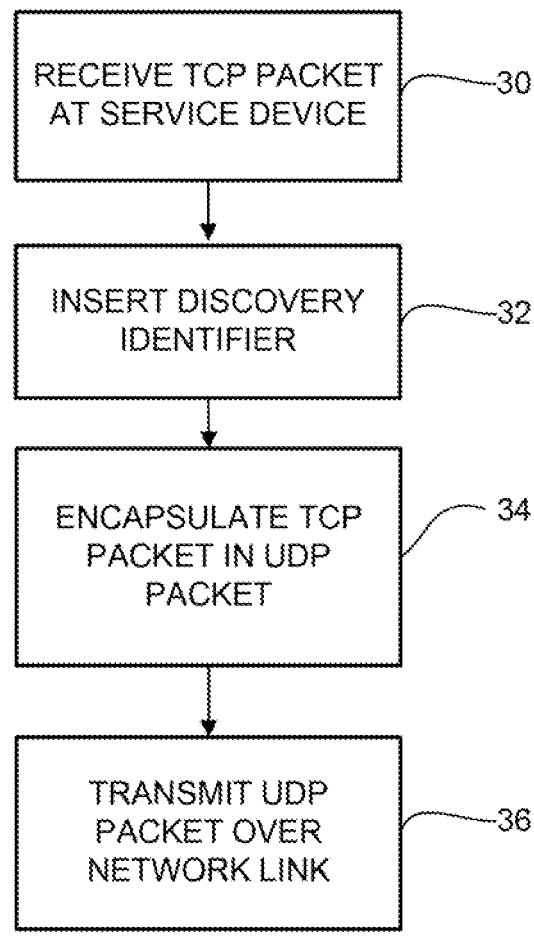
FIG. 3 is a flowchart illustrating an overview of a process for discovering a peer service device, in accordance with one embodiment.

FIG. 3 is a flowchart illustrating an overview of a process for discovering a peer service device, in accordance with one embodiment. At step 30, the service device 16 receives a TCP packet from the endpoint (e.g., client) 10 (FIGS. 1 and 3). As described in detail below, the packet may comprise a TCP-SYN (synchronize) packet for use in a TCP three-way handshake. Upon receiving the packet, the service device 16 inserts a discovery identifier (e.g., auto-discovery (AD) options) in the TCP packet for use in the optimization process (step 32). The service device 16 then encapsulates the TCP packet with the discovery identifier in a UDP packet (i.e., adds UDP header) (step 34). The service device 16 transmits the UDP packet over the network link 15 in the discovery process (step 36).

As described below, the remote service device may then send optimization information (e.g., configuration, capabilities, etc.) to the local service device so that the service devices can negotiate an optimization process for traffic transmitted over the link. Once the discovery process is complete, optimized network. TCP traffic can be sent over the network link without UDP encapsulation. This eliminates the need for a static tunnel between service devices 16. The service devices 16 may also continue to encapsulate traffic and transmit optimized traffic over the UDP tunnel 18. For example, if firewalls are present within the network path, it may be preferred to continue to use UDP traffic even after the TCP connection has been established between the client and server.

Figure 4:
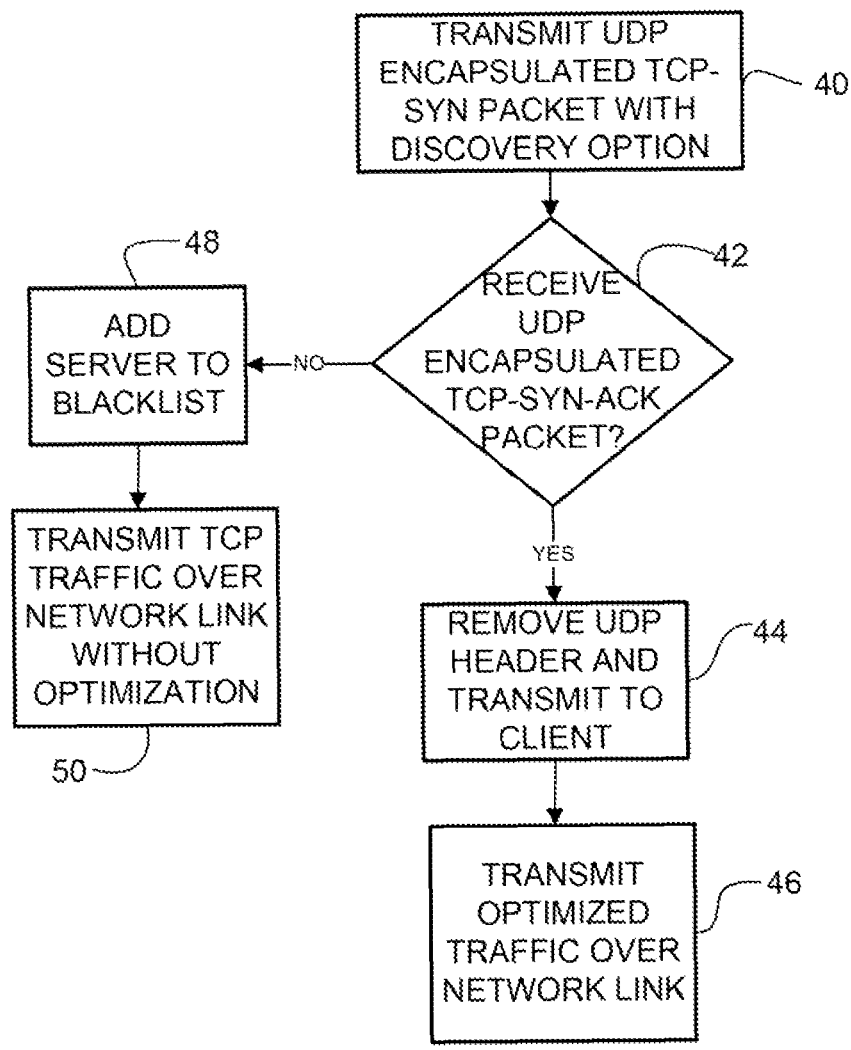
FIG. 4 is a flowchart illustrating details of a discovery process at a local service device, in accordance with one embodiment.

FIG. 4 is a flowchart illustrating details of a discovery process at the local service device 16, in accordance with one embodiment. As described above with respect to FIG. 3, the local service device 16 receives a TCP-SYN packet from the client 10, inserts a discovery option in the TCP options field, and adds a UDP header. At step 40, the local service device 16 transmits the UDP encapsulated packet over the network link 15. If there is another available service device (remote service device) at the other end of the network link 15, the local service device will receive a UDP encapsulated TCP-SYN-ACK (synchronize-acknowledgement) packet (step 42). The packet contains optimization information (e.g., auto-discovery options) inserted into the TCP packet by the remote service device 16. The local service device 16 removes the UDP header and transmits the TCP-SYN-ACK packet to the client 10 (step 44). The service device 16 can then transmit optimized traffic over the network link 15 (step 46). As noted above, the optimized traffic may be transmitted as TCP traffic or UDP traffic.

If there is no available service device at the remote end of the network link 15, the UDP packet will traverse to the destination endpoint 10. In response to receiving the UDP packet, the destination endpoint 10 may transmit a port unreachable message. For example, the UDP header of the packet transmitted to the endpoint may have source and destination port of 4050, which is registered with IANA (Internet Assigned Numbers Authority) for Cisco WAAS use. In this case, the destination 10 transmits an ICMP (Internet Control Message Protocol) port unreachable message (Type 3 and code 3) since port 4050 is reserved for Cisco WAAS use. The ICMP port unreachable message is intercepted by the local service device 16, which adds the destination (server) IP address to a blacklist that includes a list of IP addresses for which the service device does not attempt to optimize traffic (step 48). In one embodiment, the server will only be added to the blacklist if a UDP encapsulated SYN-ACK packet is not received for two times in a row on the same TCP connection.

The local service device 16 preferably still transmits TCP traffic that has not been optimized to the server (step 50).

Figure 5:
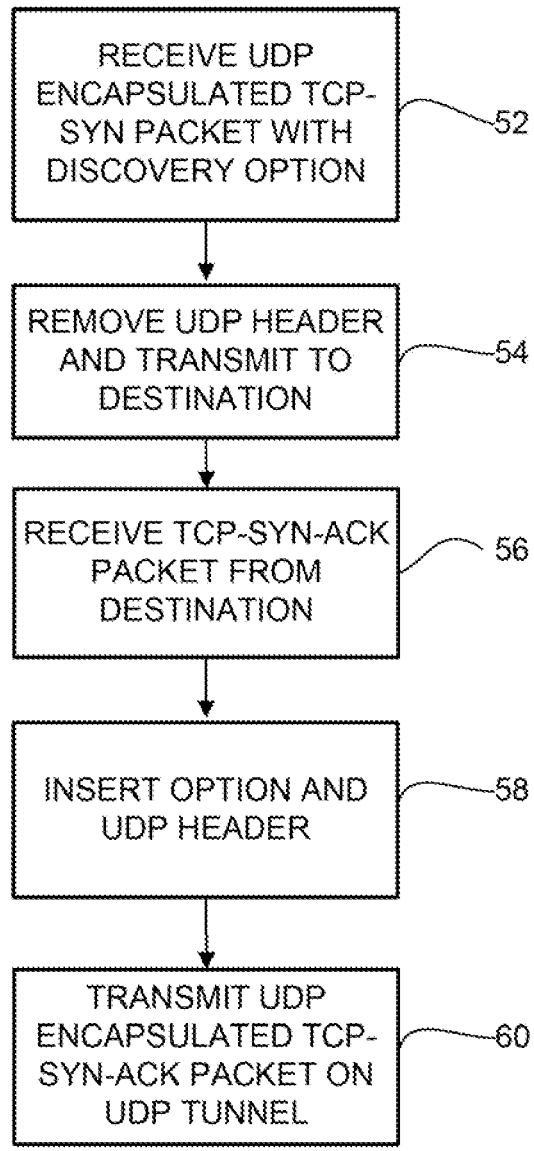
FIG. 5 is a flowchart illustrating details of the discovery process at a remote service device, in accordance with one embodiment.

FIG. 5 is a flowchart illustrating details of a discovery process at the remote service device, in accordance with one embodiment. At step 52, the remote service device 16 receives the UDP encapsulated TCP-SYN packet with the discovery option. The remote service device removes the UDP header and transmits the TCP-SYN packet to the destination endpoint 10 (step 54). In response to receiving the TCP-SYN packet, the destination transmits a TCP-SYN-ACK, which is received at the remote service device 16 (step 56). The remote service device 16 adds discovery information (e.g., auto-discovery options) to the TCP packet and adds a UDP header (step 58). The remote service device 16 then transmits the encapsulated TCP-SYN-ACK packet on the UDP tunnel to the local service device (step 60).

It is to be understood that the processes shown in FIGS. 3, 4, and 5 and described above are only examples and that steps may be added, removed, reordered, or combined without departing from the scope of the embodiments.

Figure 6:
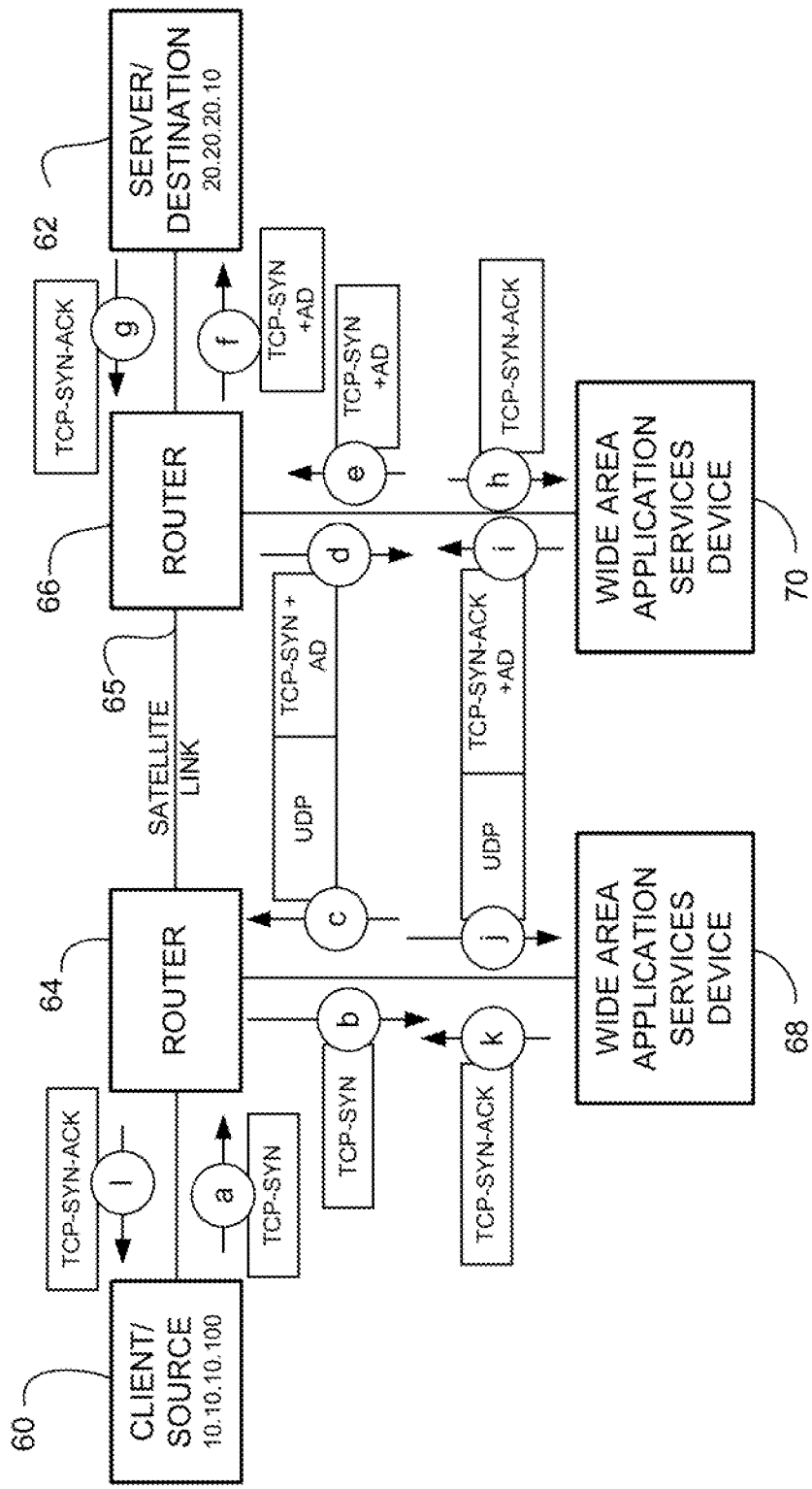
FIG. 6 illustrates packets transmitted during the discovery process.

FIG. 6 illustrates an example of packets transmitted in the discovery process described above. In the example shown in FIG. 6, client 60 initiates a connection with server 62 over satellite link 65. Routers 64, 66 are within the communication path between the client 60 and server 62 and configured to redirect TCP traffic to wide area application services (WAAS) devices 68, 70, respectively. In this example, the client 60 transmits a TCP-SYN packet (illustrated at (a) in FIG. 6) with source IP address 10.10.10.100 (client IP address), destination IP address 20.20.20.10 (server IP address), source TCP port 34566, and destination TCP port 80. The router 64 redirects the packet to service device 68 (b). The service device 68 adds auto-discovery (AD) options (discovery identifier) into the TCP-SYN packet, adds a UDP header on top of the TCP header, copies the source and destination IP addresses from the TCP header to the UDP header, and adds source and destination port of 4050 to the UDP header (c). The UDP packet with the encapsulated TCP packet traverses through router 64, across satellite link 65, and to router 66, where it is redirected to service device 70 (d). The service device 70 removes the UDP header and reads the TCP options field. The service device 70 then transmits the TCP-SYN packet towards the destination (server 62) (e). The router 66 forwards the packet to the server 62 (f).

In response to the TCP-SYN packet, the server 62 sends a TCP-SYN-AGK packet to the source (client 60) (g). The packet is redirected at router 66 to service device 70 (h). The service device 70 adds the AD options and encapsulates the packet with a UDP header with source IP address 20.20.20.10, destination IP address 10.10.10.100, source UDP port 4050, and destination UDP port 4050 (i). The packet is transmitted over the wide area network (through router 66, over satellite link 65, and through router 64) to the service device 68 (j). The service device 68 reads the AD options in the packet, removes the UDP header, and transmits TCP-SYN-ACK packet to the client 60 to complete the auto-discovery process ((k) and (l)). Once the auto-discovery process between the service devices 68, 70 is complete, a TCP packet may travel as is (without UDP header) or tunneled (with UDP header), as previously described. The client 60 transmits a TCP-ACK packet (not shown) to complete the TCP three-way handshake and open the TCP connection between the client and server 62. In one embodiment, the TCP header encapsulated within the UDP packet may be compressed to further optimize bandwidth.

If the service device 70 is not available (e.g., service device 70 not operating, link failed between router 66 and service device 70, router 66 not redirecting traffic), the UDP encapsulated TCP-SYN packet will reach the server 62. As described above, the server 62 will likely transmit an ICMP port unreachable message, which will be intercepted by the service device 68. The service device 68 adds the server IP address to its blacklist and does not attempt to optimize traffic destined for the server. The service device 68 may also be configured to add the server 62 to the blacklist if an ICMP port unreachable message is not received and no UDP encapsulated TCP-SYN-AGK message is received after a set period of time. If the source 60 does not receive a TCP-SYN-AGK packet, it will retransmit the TCP-SYN packet. When the service device 68 receives the retransmitted TCP-SYN, it will forward the packet without adding the UDP header or the AD option, since the server 62 is on the blacklist. The service device 68 may also recreate the TCP-SYN packet and send it to the server to minimize the latency as seen by the client application. In one embodiment, the blacklist containing the server 62 IP address is timed out after a specified time period (e.g., ten minutes), in which case the process described above is repeated. This allows for optimization of traffic if the service device 70 comes back online.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving a TCP (Transmission Control Protocol) packet at a service device configured to optimize traffic over a network link;
   inserting a discovery identifier in said TCP packet;
   encapsulating said TCP packet in a UDP (User Datagram Protocol) packet; and
   transmitting said UDP packet over the network link;
   wherein said TCP packet comprises a TCP synchronize packet and further comprising receiving a TCP synchronize-acknowledgement packet encapsulated in a UDP packet at the service device and transmitting optimized traffic over the network link.

2. The method of claim 1 further comprising creating a UDP tunnel between the service device and another service device located at a remote end of the network link and wherein transmitting said UDP packet comprises transmitting said UDP packet in a discovery process performed between the service devices.

3. The method of claim 1 wherein inserting a discovery identifier comprises inserting a discovery option in a TCP options field in said TCP packet.

4. The method of claim 1 wherein the service device comprises a wide area application services device.

5. The method of claim 1 wherein the network link comprises a satellite link.

6. The method of claim 1 wherein transmitting optimized traffic comprises transmitting UDP encapsulated TCP packets over the network link.

7. The method of claim 1 wherein transmitting optimized traffic comprises transmitting TCP packets over the network link.

8. The method of claim 1 further comprising receiving a port unreachable message and transmitting traffic without optimizing said traffic.

9. An apparatus comprising:
   a processor for receiving a TCP (Transmission Control Protocol) packet, inserting a discovery identifier in said TCP packet, encapsulating said TCP packet in a UDP (User Datagram Protocol) packet, and transmitting said UDP packet over a network link; and
   a traffic optimizer for optimizing traffic on the network link;
   wherein said TCP packet comprises a TCP synchronize packet and the processor is configured for receiving a TCP synchronize-acknowledgement packet encapsulated in a UDP packet and transmitting optimized traffic over the network link.

10. The apparatus of claim 9 wherein the traffic optimizer comprises a wide area application engine.

11. The apparatus of claim 9 wherein the processor is configured to create a UDP tunnel between the apparatus and a service device at a remote end of the network link, wherein said UDP packet is transmitted in a discovery process performed between the apparatus and the service device.

12. The apparatus of claim 9 wherein the discovery identifier is configured for insertion in a TCP options field in said TCP packet.

13. The apparatus of claim 9 wherein the apparatus comprises a wide area application services device.

14. The apparatus of claim 9 wherein the network link is a satellite link.

15. The apparatus of claim 9 wherein transmitting optimized traffic comprises transmitting UDP encapsulated TCP packets over the network link.

16. The apparatus of claim 9 wherein transmitting optimized traffic comprises transmitting TCP packets over the network link.

17. The apparatus of claim 9 wherein the processor is configured for receiving a port unreachable message and transmitting traffic without optimizing said traffic.

18. A non-transitory computer readable medium encoded with logic, the logic when executed operable to:
   insert a discovery identifier in a received TCP (Transmission Control Protocol) packet;
   encapsulate said TCP packet in a UDP (User Datagram Protocol) packet;
   transmit said UDP packet over a network link; and
   optimize traffic for transmittal over the network link;
   wherein said TCP packet comprises a TCP synchronize packet and further comprising logic operable to receive a TCP synchronize-acknowledgement packet encapsulated in a UDP packet and transmit optimized traffic over the network link.

* * * * *